(12) United States Patent
Nitsan et al.

(10) Patent No.: US 10,528,449 B2
(45) Date of Patent: Jan. 7, 2020

(54) GROUPING EVENT REPORTS

(71) Applicant: HEWLETT PACKARD ENTERPRISE DEVELOPMENT LP, Houston, TX (US)

(72) Inventors: Amichai Nitsan, Yehud (IL); Haim Shuvali, Yehud (IL); Aviad Israeli, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 216 days.

(21) Appl. No.: 15/521,489

(22) PCT Filed: Dec. 4, 2014

(86) PCT No.: PCT/US2014/068600
§ 371 (c)(1),
(2) Date: Apr. 24, 2017

(87) PCT Pub. No.: WO2016/089412
PCT Pub. Date: Jun. 9, 2016

(65) Prior Publication Data
US 2017/0322864 A1    Nov. 9, 2017

(51) Int. Cl.
*G06F 11/00*    (2006.01)
*G06F 11/34*    (2006.01)
*G06F 11/30*    (2006.01)

(52) U.S. Cl.
CPC ...... *G06F 11/3495* (2013.01); *G06F 11/3006* (2013.01); *G06F 11/3065* (2013.01)

(58) Field of Classification Search
CPC ............ G06F 11/3006; G06F 11/3065; G06F 11/3082; G06F 11/324; G06F 11/3495; G06F 2201/86
See application file for complete search history.

(56) References Cited

U.S. PATENT DOCUMENTS

| | | | |
|---|---|---|---|
| 7,072,800 | B1 | 7/2006 | Fernandez et al. |
| 7,676,706 | B2 | 3/2010 | Addleman et al. |
| 8,467,987 | B1 | 6/2013 | Davidson et al. |
| 8,566,391 | B2 | 10/2013 | Saito et al. |
| 2003/0156549 | A1 | 8/2003 | Binder et al. |
| 2005/0204343 | A1 | 9/2005 | Kisamore et al. |

(Continued)

FOREIGN PATENT DOCUMENTS

CN        103338290 A    10/2013

OTHER PUBLICATIONS

Casper S. Jensen et al. 'Automated Testing with Targeted Event Sequence Generation.' In: ISSTA '13, Jul. 15-20, 2013, Lugano, Switzerland; Retrived from: http://users-cs.au.dk/amoeller/papers/collider/paper.pdf; 11 pages.

(Continued)

*Primary Examiner* — Dinku W Gebresenbet

(57) ABSTRACT

A monitoring system includes a monitoring device for monitoring an event occurred on an original screen and a change from the original screen to a target screen as a result of the event. The monitoring device may include a report monitor to obtain a plurality of event reports, and a report analyzer to group the plurality of event reports into a plurality of report groups and to generate an event summary for at least one of the plurality of report groups.

13 Claims, 7 Drawing Sheets

(56) References Cited

U.S. PATENT DOCUMENTS

| | | |
|---|---|---|
| 2009/0100518 A1 | 4/2009 | Overcash |
| 2011/0041121 A1 | 2/2011 | Schalk |
| 2012/0110062 A1* | 5/2012 | Savage .................. H04L 43/04 |
| | | 709/203 |
| 2012/0151269 A1 | 6/2012 | Park |
| 2012/0253745 A1 | 10/2012 | Dhanapal et al. |
| 2013/0179858 A1 | 7/2013 | Mecke et al. |
| 2014/0033055 A1 | 1/2014 | Gardner et al. |
| 2017/0010951 A1* | 1/2017 | Venkataraman .... G06F 11/3612 |

OTHER PUBLICATIONS

International Search Report and Written Opinion; PCT/US2014/068600; dated Aug. 28, 2015; 10 pages.

Unknown, Mobile APM Features, date unknown, 11 pages http://newrelic.com/mobile-monitoring/features.

Unknown, Mobile App Testing: Modern Practices Overview, Date Unknown, 11 pages http://www.abtosoftware.com/blog/mobile-app-testing-modern-practices-overview.

Unknown, Mobile Application Instrumentation Telemetry Interface (MAITI), date unknown, 10 pages https://github.com/riverbed/maiti.

* cited by examiner

| EVENT | ORIGINAL SCREEN | TARGET SCREEN | EVENT INFORMATION |
|---|---|---|---|
| "Submit" button clicked | "Login" | "Authentication Failed" | Response time = 2.96 (sec) |

| EVENT | ORIGINAL SCREEN | TARGET SCREEN | SUMMARY | |
|---|---|---|---|---|
| "Submit" button clicked | "Login" | "Welcome" | Total events = 12, 305<br>Total users = 560<br>Average response = 1.15 (sec) | 410 |
| "Submit" button clicked | "Login" | "Authentication Failed" | Total events = 981<br>Total users = 140<br>Average response = 3.08 (sec) | 420 |
| "OK" button clicked | "Authentication Failed" | "Login" | Total events = 981<br>Total users = 140<br>Average response = 0.6 (sec) | 430 |
| ⋮ | ⋮ | ⋮ | ⋮ | |

| EVENT | RESPONSE | EVENT INFORMATION |
|---|---|---|
| "www.example.com/1.jpg" requested | HTTP 200 | Response time = 0.53 (sec) |

590

| EVENT | RESPONSE | EVENT INFORMATION |
|---|---|---|
| "www.example.com/1.jpg" requested | HTTP 404 | Response time = 0.3 (sec) |

*FIG. 5A*

| EVENT | RESPONSE | SUMMARY | |
|---|---|---|---|
| "www.exampe.com/1.jpg" requested | HTTP 200 | Total events = 110<br>Total users = 20<br>Average response = 0.49 (sec) | 510 |
| "www.exampe.com/1.jpg" requested | HTTP 404 | Total events = 3<br>Total users = 1<br>Average response = 0.35 (sec) | 520 |
| "www.exampe.com/2.jpg" requested | HTTP 200 | Total events = 405<br>Total users = 29<br>Average response = 0.6 (sec) | 530 |
| "www.exampe.com/2.jpg" requested | HTTP 404 | Total events = 8<br>Total users = 2<br>Average response = 0.25 (sec) | 540 |
| ⋮ | ⋮ | ⋮ | |

*FIG. 5B*

GROUPING EVENT REPORTS

CLAIM FOR PRIORITY

The present application is a national stage filing under 35 U.S.C. § 371 of PCT application number PCT/US2014/068600, having an international filing date of Dec. 4, 2014, the disclosure of which is hereby incorporated by reference in its entirety.

BACKGROUND

Developers of mobile, web, desktop or other types of software applications often desire to obtain information about the application's performance, failures, usability, user preferences, and so forth. Such information may be used, for example, to fix any issues related to the application, better identify and address user behavior and preferences, etc. Accordingly, various testing and monitoring tools have been developed to allow collecting such information from multiple users and devices. The tools may compile, process and present the information to developers or other users in a meaningful way.

BRIEF DESCRIPTION OF THE DRAWINGS

The following detailed description references the drawings, wherein:

FIG. 4 illustrates example event summaries;

FIG. 5A illustrates additional example events;

FIG. 5B illustrates additional example event summaries;

DETAILED DESCRIPTION

Figure 1:
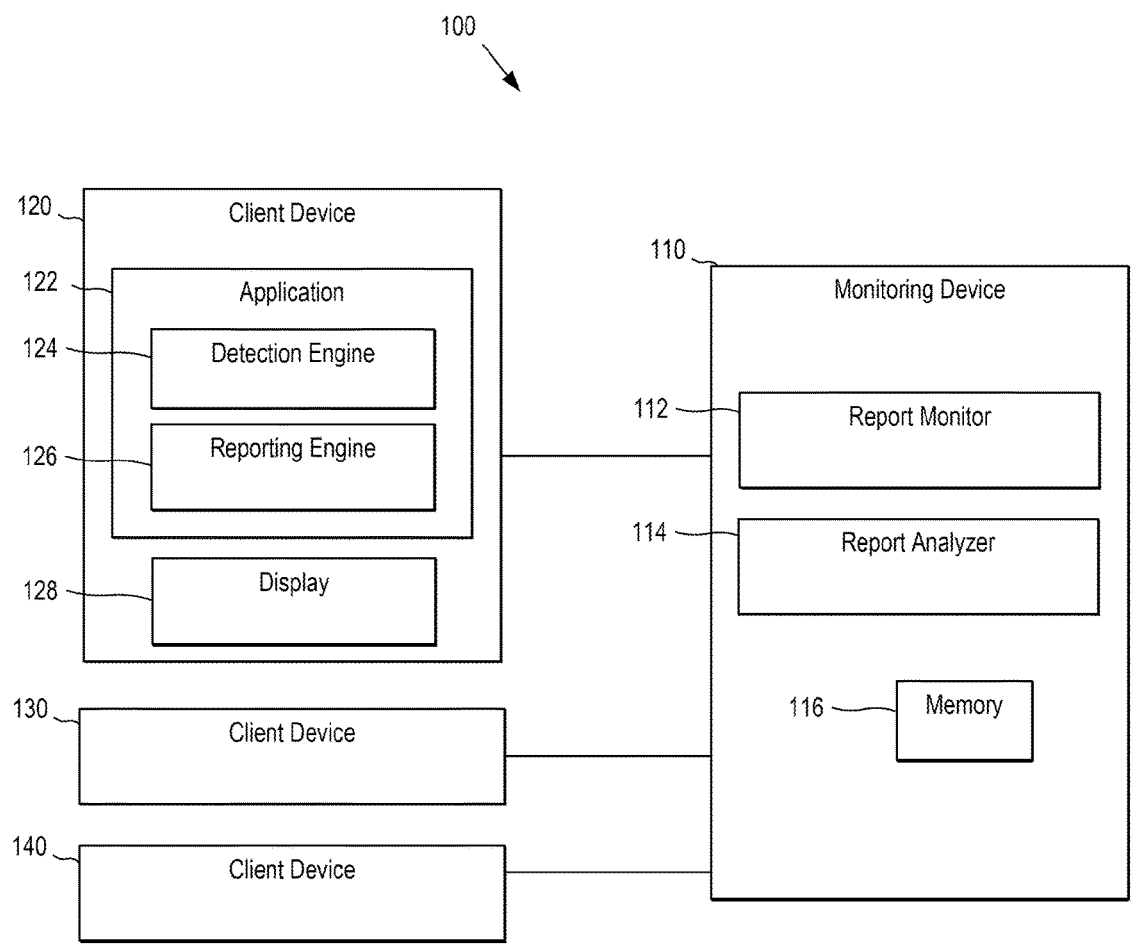
FIG. 1 is a block diagram of an example monitoring system.

As mentioned above, capturing information about the application's performance and execution may be useful for identifying various issues, analyzing user behavior, and improving the application. In some examples, such information may be received from a number of client devices running the application in the form of reports. The received reports may be grouped, summarized, and presented to a monitoring user (e.g., an application developer) in a way to would allow the monitoring user to quickly obtain useful information.

In some examples, the reports may be generated in response to application events (hereinafter, "events") that may include any type of events, operations, notifications, etc., related to the application. In some examples, events may correspond to or be associated with the application's user interface, and may include user interactions with user-interface components, such as user selections (e.g., clicks, touches, swipes, etc.) of buttons, hyperlinks, windows, etc. Events may also be unrelated or not directly related to user actions. Such events may include, for example, timers, notifications, hardware or software interrupts, or other synchronous or asynchronous events occurring within the application or associated software or hardware.

As described above, an event may be associated with an application. The application may be a desktop application, a mobile app, a web-based application, or any other type of software, firmware, and/or hardware application. In some examples, an event may also be associated with one or more application screens, such as an original screen and a target screen. The original screen may be a screen at which the event occurred, such as the screen that was being displayed when the event occurred, or the screen that contained a user-interface component associated with the event (e.g., the button that was clicked).

The target screen may be the screen that is rendered or displayed by the application in response to the event. Put differently, an event occurring at an original screen may cause the application or the device running the application to display a target screen. For example, when a user clicks on a certain button (at an original screen), the application may display a new (target) screen. The target screen may be different from the original screen, or it may be similar or identical to the original screen. Additionally, the target screen may replace the original screen, or it may be displayed in addition to (e.g., next to or on top of) the original screen.

In some examples, the same event occurring at the same original screen may cause the application to display different target screens. For example, when the user clicks on a button "Submit," depending on whether the user provided the right username and password, the application may display either a "Welcome" screen, a "Failed authentication" screen, or the original screen requesting the user to re-enter the credentials.

Because the same event occurring at the same original screen may result in different target screens, it may be desirable to identify the resulting target screen in the event report that is sent to the monitoring device. This may enable the monitoring device to differentiate between two identical events occurring at the same original screen but resulting in different target screens, and analyze these events separately. Allowing the monitoring device to differentiate between these two types of events may be advantageous for a number of reasons. For example, after the user presses "Submit" at a login screen, it may take an average of one second for the application to display a successful login screen, and an average of three seconds to display an error screen, for example, if unsuccessful logins require some additional processing by the application. The monitoring user may choose to know the average response time to successful logins and an average response time to unsuccessful logins, across multiple attempts by multiple users of multiple client devices. If the event reports corresponding to user logins do not indicate the login results (e.g., by identifying the target screen), the monitoring user may only obtain the average across all logins (both successful and unsuccessful), making it difficult to identify and fix potential performance issues.

Examples disclosed herein describe, among other things, a monitoring system that includes a monitoring device. The monitoring device may include a report monitor configured to obtain a plurality of event reports, each event report corresponding to an event that occurred at a first screen of an application causing the application to render a second screen. Each event report may include event information associated with the event, a first identifier of the first screen, and a second identifier of the second screen. The monitoring device may also include a report analyzer configured to group the plurality of event reports into a plurality of report groups based at least on the first identifier and the second identifier. The monitoring device may further be configured to generate an event summary for at least one group from the plurality of report groups, where the event summary summarizes event information of event reports within the group.

FIG. 1 is a block diagram of an example monitoring system 100 for monitoring event reports. Monitoring system 100 may include a monitoring device 110 and a number of client devices. A client device (e.g., 120, 130, 140, etc.) may include any suitable computing device complying with the principles disclosed herein. As used herein, a "computing device" may include a smartphone, cell phone, tablet, phablet, laptop, desktop, server, application-specific computing device, any other processing device or equipment, or a combination thereof. While client devices 120, 130, 140, etc. are described as "client" devices to indicate the client-server relationship between these devices and monitoring device 110, it should be appreciated that the term "client" is not limiting, and a client device can also serve as a server, for example, in the context of another application.

Client device 120 may be described specifically herein, but it should be understood that client devices 130, 140 and any other client device in monitoring system 100 may be similar to client device 120 as described herein. Client device 120 may include a display 128, which may be implemented using any suitable technology, such as LCD, LED, OLED, TFT, Plasma, etc. In some examples, display 128 may be a touch-sensitive display.

Client device 120 may also include an application 122 that runs on the client device 120. Application 122 may include instructions (e.g., stored on a machine-readable storage medium of client device 120) that, when executed (e.g., by a processor of client device 120), may implement the functionality of the application. Alternatively or in addition, application 122 may include electronic circuitry (i.e., hardware) that implements the functionality of the application. Application 122 may be any type of application, for example, a software program, web browser, web application, mobile application, desktop application, or the like.

Client device 120 may also include a detection engine 124. Detection engine 124 may generally represent any combination of hardware and programming. Detection engine 124 may be included as part (e.g., a separate thread or process) of application 122 or may be independent of (e.g., in communication with) application 122. Detection engine 124 may detect one or more events associated with application 122. Such events may include user interactions, such as mouse events (e.g., left-click, right-click, double-click, mouse release, mouse hover, etc.), keyboard events (e.g., single or multiple key inputs), finger events (e.g., one-finger and multi-finger touches and gestures), and so forth. The user interactions may, in some examples, be associated with user-interface components, such as frames, buttons, checkboxes, radio buttons, text boxes, hyperlinks, etc. In these examples, detection engine 124 may detect and identify the user-interface component associated with the event.

In some examples, events other than user manipulations of a user interface may be detected by detection engine 124. Such events may include, for example, system events such as an expired timer, a low-battery notification, a rotated display notification, a geographical location update, or any other type of synchronous or asynchronous message, notification, or interrupt received by application 122, for example, from the operating system or any other software, firmware, or hardware component of client device 120 or another device.

As discussed above, some events may be associated with an original screen and a target screen. For such events, detection engine 124 may detect the original and target screens associated with event. The original screen may be a screen at which the event occurred, such as the screen that was being displayed when the event occurred, the screen that contains a component associated with the event (e.g., component that was selected by the user), and so forth. The target screen may be a screen rendered or displayed by the application in response to the event, either replacing the original screen or displayed in addition to the original screen. Thus, an event occurring at a first (original) screen may cause the application or the device running the application to display a second (target) screen. While some events may cause the application to display a target screen that is different from the original screen, other events may cause the application to display the same original screen, in which case the original screen may be considered as both the original and the target screen.

Detection engine 124 may also detect or gather event information associated with the event. Event information may include, for example, performance data associated with the event. Performance data may include, for example, a response time, which may correspond to the time it takes the application to process the event and to display a target screen in response to the event. Put differently, a response time may be the length of time between the occurrence of the event (e.g., a user click) and the time that the target screen is fully displayed and ready to be used. In other examples, response time may be correspond to another interval, such as the time between the occurrence of the event and the time that the displaying of the target screen begins (e.g., some portion of the target screen has been displayed).

Event information may also include batter consumption data associated with the event, e.g., how much battery energy was consumed by the event and the resulting screen switch (if any). Event information may also include financial data associated with the event, e.g., how much money was transferred or earned as a result of the event. Event information may also include user satisfaction data, e.g., the user's ranking of the transaction associated with the event. Event information may also include user input data associated with the event, such as one or more numeric or alphanumeric values entered by the user in connection with the event (e.g., values entered by the user in text boxes at the original screen and then submitted by the user by clicking a "Submit" button). It is appreciated that in addition to the examples provided above, event information may include any other measurable data or non-measurable information associated with the event.

Reporting engine 126 may generally represent any combination of hardware and programming. Reporting engine 126 may be included as part (e.g., as a separate thread or process) of application 122 or detection engine 124, or may be independent of (e.g., in communication with) application 122 and detection engine 124. For example, after detecting an application event, as discussed above, detection engine 124 may send any information related to the detected event to reporting engine 126.

After receiving the information from detection engine 124, reporting engine 126 may generate a new event report based on the information. The new report may include an event descriptor identifying the event. The event descriptor may identify the type of the event (e.g., a button click, a touch, a swipe, a timer, a rotated display, etc.) as discussed above. If the event is associated with a user-interface component, the event descriptor may also identify the component, e.g., by the component's name, ID, caption, text, etc. For example, if the user left-clicks on a button "Submit," the event descriptor may include the following: "Left-click, button 'Submit.'"

The new report may also include a first identifier identifying the original screen and a second identifier identifying the target screen. Each identifier may identify its respective screen by a screen name, a screen ID, a screen address, a screen path, a location of a file corresponding to the screen, a signature of the screen's image, or any other identification means. As discussed above, in some examples, the target screen may be the same as the original screen. In these cases, the new report may not include a second identifier, or it may include a second identifier identical to the first identifier. In some examples, an original screen may be omitted from the new report, such as when the event descriptor identifies the user-interface component in a manner that also uniquely identifies the original screen containing the component, e.g., "scrLogin_btnSubmit," or "btnSubmit13" where there is only one button with that name in the application.

The new report may also include event information associated with the detected event. As discussed above, event information may include, for example, performance data, battery consumption data, financial data, user satisfaction data, user input data, or any other type of data related to the event. In some examples, the new report may also include general information identifying the application (e.g., application name, application version, etc.), the user, the client device, and any other relevant information.

Figures 2A, 2B:
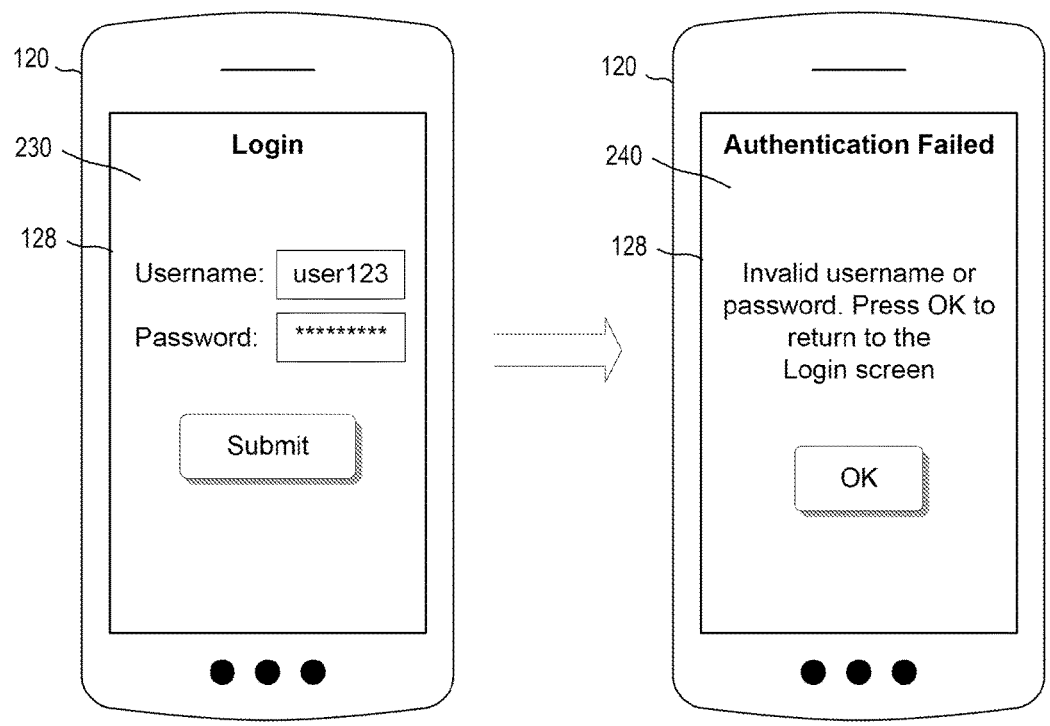
FIG. 2A illustrates an example event.
FIG. 2B illustrates an example event report generated based on the example event of FIG. 2A.

In an example illustrated in FIG. 2A, application running on client device 120 displays, on display 128, an original screen 230. At screen 230, the user may enter the user's credentials and click (or touch) a "Submit" button. In response, the application may process the user's input determine (in this example) that the credentials are wrong, and display a target screen 240 notifying the user about the failed login attempt. In this example, target screen 240 is displayed instead of original screen 250, replacing original screen 230, but as discussed above, in some examples target screen 240 could be displayed in addition to original screen 230, for example, as a new frame within original screen 230, as a pop-up or dialog window displayed on top of original screen 230, only partially covering it, etc.

In this example, detection engine 124 may detect the clicking on the "Submit" button as a new event, and send information associated with that event to reporting engine 126. Reporting engine 126 may then generate for the new event a new event report 270, an example of which is illustrated in FIG. 2B. Event report 270 includes an event descriptor 271 describing the type of the event ("clicked") and the user-interface component associated with the event (button "Submit"). Event report 270 also includes a first identifier 272 identify the original screen, in this case, by its title ("Login"), and a second identifier 273, identifying the target screen, also by its title ("Authentication Failed"). Event report 270 also includes event information 274. In this example, event information 274 includes performance data, more particularly, a response time. As discussed above, response time may correspond to the time interval (or the delay) between the occurrence of the event and the displaying of the target screen, which in this example took 2.96 seconds. As discussed above, the new report may include additional data, such as additional performance data, battery consumption data, financial data, user satisfaction data, user input data, general information about the user, the application, or the device, and so forth.

After generating new report 270, reporting engine 126 may send the new report to monitoring device 110 or to another device communicatively coupled to monitoring device 110, from which monitoring device 110 may obtain the new report. In some examples, the report may be sent to monitoring device 110 or to another device communicatively coupled thereto via at least one network. The network may be any combination of wired or wireless networks, wide-area and local-area networks, and may include any number of hubs, routers, switches, cell towers or the like. The network may be, for example, part of a cellular network, part of the Internet, part of an intranet and/or other type of network.

Figures 3A, 3B:
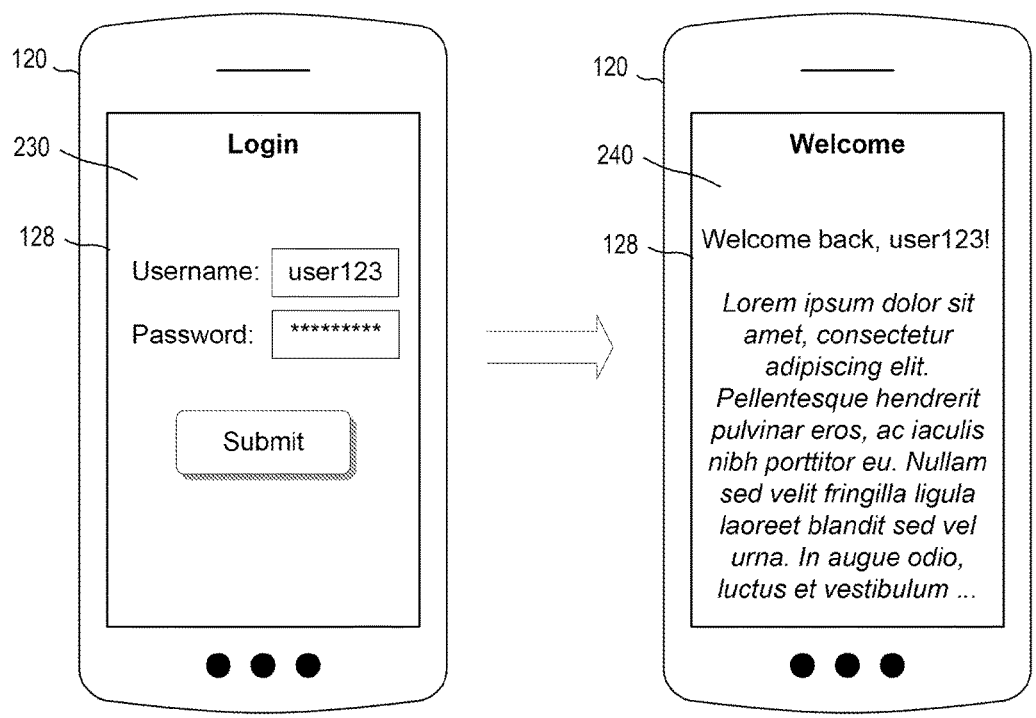
FIG. 3A illustrates another example event.
FIG. 3B illustrates another example event report generated based on the example event of FIG. 3A.

In the example of FIG. 3A, a user is using the application running on client device 120, this time entering the correct information at original screen 230. It is appreciated that while the same client device 120 is illustrated in this example for brevity, other examples may include any other client device (e.g., 130, 140, etc.) running the same application and showing the same original screen 230 to the user. In this example, after the user clicks (or touches) the "Submit" button, the application processes the user's input and determines that the credentials are correct. Accordingly, the application displays a target screen 250, which in this example is different from target screen 240 shown in FIG. 2A. Target screen 250 shows a welcome message, indicating to the user that the login was successful.

In this example, detection engine 124 may again detect the clicking on the "Submit" button as a new event, and send information associated with that event to reporting engine 126. Reporting engine 126 may then generate, for the new event, a new event report 280, an example of which is illustrated in FIG. 3B. Event report 280 includes an event descriptor 281 describing the type of the event ("clicked") and the user-interface component associated with the event (button "Submit"). Event report 280 also includes a first identifier 282 identify the original screen, in this case, by its title ("Login"), and a second identifier 283, identifying the target screen, also by its title ("Welcome"). Event report 280 also includes event information 284. In this example, event information 284 includes performance data, more particularly, a response time, which in this example is 1.31 seconds.

As with new report 270, after generating new report 280, reporting engine 126 may send (e.g., over one or more networks) new report 280 to monitoring device 110 or to another device communicatively coupled to monitoring device 110, from which monitoring device 110 may obtain new report 280.

Monitoring device 110 may include one or more suitable computing devices complying with the principles disclosed herein. As discussed above, a "computing device" may include a smartphone, cell phone, tablet, phablet, laptop, desktop, server, application-specific computing device, any other processing device or equipment, or a combination thereof. In some examples, monitoring device 110 may be separate from any client devices (e.g., 120, 130, 140, etc.), while in other examples, monitoring device 110 may be physically integrated with one or more client devices (e.g., 120, 130, 140, etc.). In some examples, monitoring device 110 may include, among other things, a report monitor 112, a report analyzer 114, and a memory 116. Memory 116 may include any type of volatile or non-volatile memory, such as a random-access memory (RAM), flash memory, hard drive, memristor-based memory, and so forth. Memory 116 may be located on monitoring device 110, or it may be located on one or more other devices and be accessible by and in communication with monitoring device 110.

Report monitor 112 may generally represent any combination of hardware and programming. In some examples, report monitor 112 may be configured to obtain a plurality of event reports, each event report being generated by any client device (e.g., 120, 130, 140, etc.). Thus, in some examples, report monitor 112 may be configured to obtain two or more event reports generated by a single client device, while in other examples, report monitor 112 may be configured obtain two or more event reports generated by two or more different client devices. Report monitor 112 may be configured to obtain the event reports, for example, via one or more networks, either from the client devices or from one or more other computing devices. For example, the event reports may be obtained from one or more servers that receive the event reports from the client devices, and temporarily store them.

As discussed above, at least some of the received event reports may correspond to (e.g., may have been generated in response to) events that occurred at a first (original) screen of an application, causing the application to render a second (target) screen. The obtained event reports may each include, among other things, event information associated with the event, a first identifier of the first screen, and a second identifier of the second screen. As discussed above, the event reports may also include event descriptors indicating the type of the event and, in some examples, a user-interface component associated with the event.

Report analyzer 114 may generally represent any combination of hardware and programming, and may be either separate from report monitor 112 or integrated with report monitor 112. In some examples, report analyzer 114 may be configured to receive a plurality of event reports from report monitor 112, and to group the plurality of event reports into a plurality of (e.g., two or more) report groups. In some examples, report analyzer 114 may be configured to group the event reports based at least on the first identifier and the second identifier. For example, each report group may only include event reports having the same first identifier and the same second identifier, and not include any event reports having a different first identifier, a different second identifier, or both. Thus, in some examples, reports having the same first identifier (corresponding to the same original screen) and different second identifiers (corresponding to different target screens) will be added to different groups.

In some examples, report analyzer 114 may further group the event reports based on the event descriptor, meaning that each report group may only include event reports having the same first identifier, the same second identifier, and the same event descriptor, and not include any reports in which one of these parameters is different from the rest of reports in the group. As discussed above, in some examples, the event reports may not include a first identifier. In these cases, report analyzer 114 may be configured to group event reports, for example, based on the second identifier and the event descriptor.

In some examples, report analyzer 114 may also be configured to generate, for each event group or at least for one event group, an event summary. In some examples, the generated event summary may summarize event information of all, or at least some (e.g., two) reports within the group. The event summary may include a summary of all or some event information included in the group's reports. For example, if the event information included in the reports includes performance data, the event summary may include a summary of the performance data, which may include, for example, a statistical summary or analysis of the performance data. For example, if performance data includes a response time, the event summary for the group may include a statistical summary or analysis (e.g., an average, a median, a standard deviation, a variance, a maximum value, a minimum value, a full distribution graph, etc.) of response times of all (or at least some) event reports within the group. As another example, if the event information included in the reports includes battery consumption data, financial data, user satisfaction data, and/or user input data, the event summary may include a summary of the battery consumption data, a summary of the financial data, a summary of the user satisfaction data, and/or a summary of the user input data, respectively. Similarly, if the event information includes some additional data associated with the events, the event summary may include a summary of the additional data. As with the summary of performance data discussed above, any of the summaries included in the event summary may include a statistical summary or analysis of the corresponding types of data. The statistical summaries or analyses may include average values, median values, standard deviations, variances, distribution graphs, maximum or minimum values, most common values, least common values, distribution graphs of all values, or any other information describing and summarizing the event information included in the event reports within the report group.

In some examples, the event summary may also include information unrelated to specific event information included in event reports. Such information may include a total number of reports in the group, a total number of users from which the reports were received, a total number of client devices from which the reports were received, and so forth.

FIG. 4 illustrates example event summaries 410, 420, and 430. In the example of FIG. 4, event summary 410 is generated for a group of events corresponding to successful logins, that is, to users clicking on a "Submit" button at a "Login" screen and getting a "Welcome" screen as a result. Event summary 410 shows that 12,305 total events were received from 560 different users, and that the average response time across all the events was 1.15 seconds. In contrast, event summary 420 is generated for a group of events corresponding to unsuccessful logins, that is, to users clicking on a "Submit" button at a "Login" screen and getting an "Authentication Failed" screen as a result. Event summary 420 shows that 981 such events were received from 140 different users, and that the average response time across these events was 3.08 seconds. Event summary 420 is generated for a group of events corresponding to the user's acknowledging the error message by clicking "OK" at the "Authentication Failed" screen and returning back to the "Login" screen as a result. Event summary 430 shows that 981 such events were received from 140 different users (that is, all users that got the error message acknowledged it), and that the average response time across these events was 0.6 seconds.

In some examples, after generating the one or more event summaries for one or more event groups, report analyzer 114 may store the event summaries and/or full event information for all received event reports in a memory such as memory 116. Alternatively or additionally, report analyzer 114 may provide the event summaries for display by a display physically or communicatively coupled to monitoring device 110 (not shown in the figures for reasons of brevity). A monitoring user (e.g., a developer) may then select a particular group, and in response to the selection, report analyzer 114 may provide for display any additional information about any of the events within the selected groups.

It is appreciated that in some examples report monitor 112 may be continuously obtaining new event reports and transferring them to report analyzer 114, which may add them to previously formed report groups based on the same grouping criteria, update the event summaries for those groups, store the new reports and/or the updated event summaries in a memory (e.g., 116), and provide the updated event summaries for display.

While in the examples discussed above, an event summary summarizes event information for event reports having the same first and second identifiers, it is appreciated that in some examples report analyzer 114 may be configured to additionally or alternatively prepare an event summary of event reports having different second identifiers. For example, report analyzer 114 may be configured to generate an event summary for two or more different groups, e.g., to two or more groups having the same first identifier (corresponding to the same original screen) and the same event descriptor, but different second identifiers (corresponding to different target screens). As another example, report analyzer 114 may be configured to group event reports having different second identifiers (but having the same first identifiers and, optionally, the same event descriptors) into the same group, and prepare the event summary for that group. Using the example illustrated in FIG. 4, instead or in addition to grouping successful and unsuccessful logins into separate groups with separate summaries 410 and 420, respectively, report analyzer 114 may be configured to group event reports corresponding to both types of logins into the same group and to generate a summary for both types of logins.

While the above examples refer to application events occurring at a first screen of an application, causing the application to display a second screen, it is appreciated that the systems and methods described herein may similarly be applicable to other types of application events. One such type of request may be a request for a resource, such as a webpage, a file, a service, etc., where the resource may be hosted locally on client device 120 or stored on a remote device communicatively coupled to client device 120 (e.g., via one or more networks such as the Internet). In some examples, the resource request may be a hypertext transfer protocol (HTTP) request, and the requested resource may be identified by the application using a uniform resource identifier (URI). In some examples, the resource request may also be implemented with an HTTP-based protocol, such as a representational state transfer (REST), a simple object access protocol (SOAP), etc. It is appreciated, however, that the examples described herein are not limited to HTTP or HTTP-based requests, and other types of requests and protocols are contemplated.

The application may send the resource request to a device hosting the resource, and receive a response (e.g., from the device hosting the resource or from another device). The response may, in some examples, include the requested resource. The response may also include a status indicating whether the resource was successfully obtained or whether some error occurred. For example, if the resource request is an HTTP request, the response may be an HTTP response including a status code indicating whether request was processed successfully (e.g., HTTP 200 OK), whether there was an error (e.g., HTTP 404 Not Found), etc.

In some examples, detection engine 124 may detect a resource request issued by the application as an application event. In these examples, detection engine 124 may also detect a response received by the application in response to the resource request. Detection engine 124 may also determine event information, such as performance data, associated with the resource request. Performance data may include a response time, which may correspond, for example, to the time it took for the response to be received, or to the time it took for the requested resource to be fully received by the application.

In some examples, reporting engine 126 may generate, in response to detecting the resource request event and the response, a new event report. The new event report may include the resource request, or at least identify the requested resource. The new report may also include the response, or at least indicate the status code included in the response, or at least indicate whether the request was processed successfully or whether some error occurred. For example, FIG. 5A illustrates an example event report 580 generated as a result of a detected request for resource "www.example.com/1.jpg" for which a response "HTTP 200" was received after 0.53 seconds, and an example report 590 generated as a result of a detected request for the same resource, but for which a response "HTTP 404" was received after 0.3 seconds.

As discussed above, after generating the new report, reporting engine 126 may send the new report to monitoring device 110 or to another device communicatively coupled to monitoring device 110, from which monitoring device 110 may obtain the new report. Report monitor 112 of monitoring device 110 may obtain the new report and pass it to report analyzer 114, which may group the new reports received from report monitor 112 into groups. In case of event reports generated in response to resource requests (e.g., HTTP requests), report monitor 112 may group the new reports based at least on the requested resource and the response. Thus, in some examples, event reports having the same requested resource but different responses (e.g., HTTP 200 and HTTP 404) will be added to different groups.

In some examples, a resource request detected by detection engine 124 may be associated with a screen. For example, the resource request may associated with a hyperlink appearing on a particular screen. In these examples, reporting engine 124 may include in the event report sent to monitoring device 110 an indicator of the original screen, and report analyzer 114 may group the new reports based not only on the requested resource and the response, but also based on the original screen associated with the resource request.

After grouping the event reports, report analyzer 114 may also be configured to generate, for each event group or at least for one event group, an event summary, which may include a summary of all or some event information included in the group's reports, as discussed above. For example, FIG. 5B, three event summaries 510, 520, and 530 are illustrated. As illustrated in FIG. 5B, event reports corresponding to the same requested resource but different responses are grouped into different groups. Based on the foregoing discussion, it is appreciated that various techniques and functionalities discussed in connection with events associated with two screens are also applicable to events associated with a resource request and response thereto, and vice versa.

It is also appreciated that in addition to events associated with a first screen and a second screen, and events associated with a resource request and response, the various techniques and functionalities discussed herein may also be applicable to any event that changes the state of the application in any way. Thus, when an event causes the application to change states from a first state to a second state, detection engine 124 may detect the event and the two states, reporting engine 126 may generate and send to monitoring device 110 a report that includes, for example, an event descriptor, event information, a first indicator of the first state and a second indicator of the second state. In some examples, an application state may be represented by one or more values (e.g., values stored in a memory or a database on or remote to the client device), in which case the first and second indicators may include such values. After reporting engine 126 generates and sends the event report, report monitor 112 may obtain the event report and pass it to report analyzer 114. Report analyzer 114 may group event reports based, for example, on each report's event descriptor, first indicator, and second indicator, as discussed above. Thus, event reports having the same event descriptors and first indicators but different second indicators may be included in different groups. Report analyzer 114 may then generate an event summary for at least one group based on the event information of the reports within that group, as discussed above.

In the foregoing discussion, report monitor 112, report analyzer 114, detection engine 124, and reporting engine 126 were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like.

Figure 6:
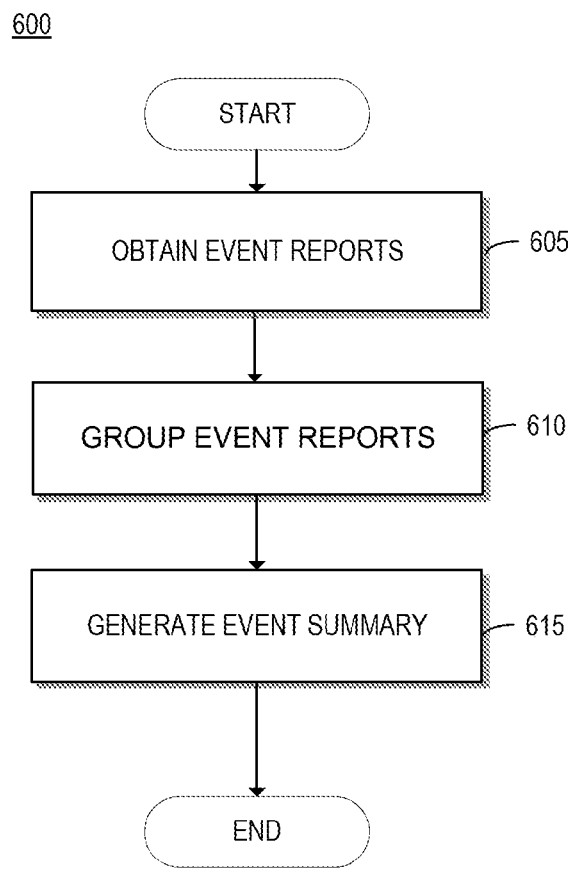
FIG. 6 shows a flowchart of an example method for monitoring event reports.

FIG. 6 is a flowchart of an example method 600 for monitoring event reports. Method 600 may be described below as being executed or performed by a system or by a computing device, for example, monitoring system 100 or monitoring device 110 of FIG. 1. Other suitable systems and/or computing devices may be used as well. Method 600 may be implemented in the form of executable instructions stored on at least one non-transitory machine-readable storage medium of the system and executed by at least one processor of the system. Alternatively or in addition, method 600 may be implemented in the form of electronic circuitry (e.g., hardware). In alternate examples of the present disclosure, one or more blocks of method 600 may be executed substantially concurrently or in a different order than shown in FIG. 6. In alternate examples of the present disclosure, method 600 may include more or less blocks than are shown in FIG. 6. In some examples, one or more of the blocks of method 600 may, at certain times, be ongoing and/or may repeat.

At block 605, method 600 may obtain a plurality of (e.g., two or more) event reports, which in some examples may include receiving the event reports from at least two client devices via at least one network. As discussed above, in some examples, each event report may include event information of an event associated with a first and second screens of an application, and may identify the first and second screens. In some examples, the event information may include performance data, battery consumption data, financial data, user satisfaction data, user input data, or any other data associated with the event. In some examples, the event may be associated with a component of the application's user interface, in which case the event report may identify that component.

At block 610, the method may group the obtained plurality of event reports into a plurality of (e.g., two or more) groups. In some examples, as discussed above, the reports may be groups such that each group includes event reports associated with the same first screen and with the same second screen, and does not include event reports associated with another first screen or another second screen. At block 615, the method may generate an event summary for at least one of the groups, based on the group's event reports. In some examples, the event summary may be generated based on the event information included in the group's reports. As discussed above, after generating the event summary, the event summary may be stored in a memory and/or provided for display to the user.

Figure 7:
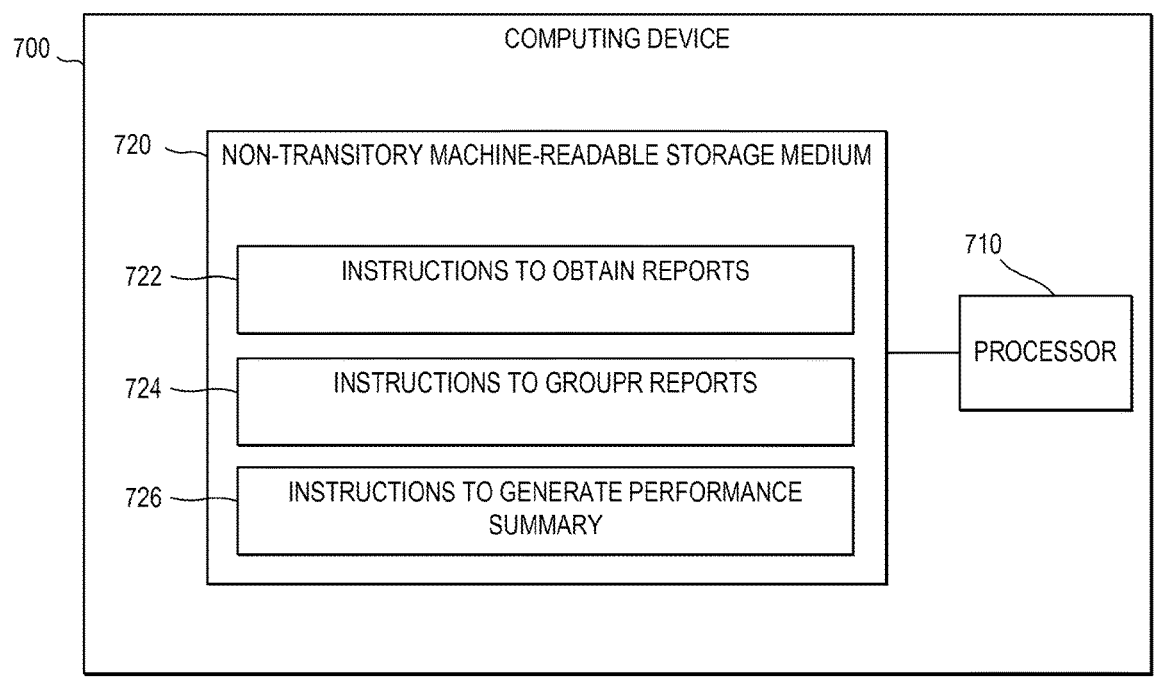
FIG. 7 is a block diagram of an example computing device.

FIG. 7 is a block diagram of an example computing device 700 for generating reports. Computing device 700 may be similar to monitoring device 110 of FIG. 1. In the example of FIG. 7, computing device 700 includes a processor 710 and a non-transitory machine-readable storage medium 720. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 710 may be one or more central processing units (CPUs), microprocessors, and/or other hardware devices suitable for retrieval and execution of instructions stored in non-transitory machine-readable storage medium 420. In the particular example shown in FIG. 7, processor 710 may fetch, decode, and execute instructions 722, 724, 726, or any other instructions (not shown for brevity) to generate one or more reports. As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 720 may be any electronic, magnetic, optical, or other physical storage device that stores executable instructions. Thus, medium 720 may be, for example, Random Access Memory (RAM), an Electrically-Erasable Programmable Read-Only Memory (EEPROM), a storage drive, an optical disc, and the like. Medium 720 may be disposed within computing device 700, as shown in FIG. 4. In this situation, the executable instructions may be "installed" on computing device 700. Alternatively, medium 720 may be a portable, external or remote storage medium, for example, that allows computing device 700 to download the instructions from the portable/external/remote storage medium. In this situation, the executable instructions may be part of an "installation package". As described herein, medium 720 may be encoded with executable instructions for generating report(s).

Referring to FIG. 7, instructions 722, when executed by a processor (e.g., 710), may cause a computing device (e.g., 700) to obtain a plurality of reports. In some examples, each obtain report (or at least some obtained reports) may identify a requested resource. As discussed above, the requested resource may be a resource that was requested by an application running on a client device (e.g., 120, 130, 140, etc.). The report may also include response information associated with the requested resource and performance data associated with the requested resource. The performance data may include a response time which, as discussed above, may correspond to the time that passes between sending the resource request and receiving the response or the requested resource. In some examples, the resource may have been requested by the client device via HTTP and the response information may include HTTP status code that was included in the HTTP response received in response to the HTTP request.

Instructions 724, when executed by a processor (e.g., 710), may cause a computing device (e.g., 700) to group the plurality of reports into a plurality of groups based at least on the requested resource and the response information. Instructions 726, when executed by a processor (e.g., 710), may cause a computing device (e.g., 700) to generate a performance summary for at least one group from the plurality of groups based at least on the performance data of the reports included in the group.

The invention claimed is:

1. A method comprising:
   detecting, by a processor, different occurrences of a same event on a first screen of an application;
   detecting, by the processor, different second screens being displayed as results of the different occurrences of the event, wherein the different second screens include a successful second screen indicating success of the event and an unsuccessful second screen indicating a failure of the event;
   obtaining, by the processor, a first response time indicating a length of time for the application to process the event to display the successful second screen and a second response time indicating a length of time for the application to process to display the unsuccessful second screen;
   obtaining a plurality of event reports for the different occurrences of the event, wherein each of the plurality of event reports includes an identifier of the first screen where the event occurred, an identifier of either the successful second screen or the unsuccessful second screen, and event information including either the first response time or the second response time;
   grouping the plurality of event reports into a plurality of groups including a first group of event reports associated with the successful second screen and a second group of event reports associated with the unsuccessful second screen; and
   generating, by the processor, an event summary that summarizes the first group of event reports associated with the successful second screen and the first response time, and the second group of event reports associated with the unsuccessful second screen and the second response time.

2. The method of claim 1, wherein:
   the event information further comprises at least one of battery consumption data, financial data, user satisfaction data, and user input data; and
   generating the event summary comprises generating the event summary based at least on the event information.

3. The method of claim 1, wherein the event is associated with a component of the application's user interface, and wherein each of the event reports identifies the component.

4. The method of claim 1, wherein obtaining the plurality of event reports comprises receiving the plurality of event reports from at least two client devices via at least one network.

5. A monitoring system comprising a monitoring device, wherein the monitoring device comprises:
   a processor; and
   a memory storing instructions executable by the processor to cause the processor to:
   detect different occurrences of a same event on a first screen of an application;
   detect different second screens being displayed as results of the different occurrences of the event, wherein the different second screens include a successful second screen indicating success of the event and an unsuccessful second screen indicating a failure of the event;
   obtain a first response time indicating a length of time for the application to process the event to display the successful second screen and a second response time indicating a length of time for the application to process to display the unsuccessful second screen;
   obtain a plurality of event reports for the different occurrences of the event, wherein each of the plurality of event reports includes an identifier of the first screen where the event occurred, an identifier of either the successful second screen or the unsuccessful second screen, and event information including either the first response time or the second response time;
   group the plurality of event reports into a plurality of report groups including a first group of event reports associated with the successful second screen and a second group of event reports associated with the unsuccessful second screen; and
   generate an event summary that summarizes the first group of event reports associated with the successful second screen and the first response time, and the second group of event reports associated with the unsuccessful second screen and the second response time.

6. The monitoring system of claim 5, wherein each of the plurality of event reports further comprises an event descriptor comprising a type of the event, and wherein the instructions are executable to cause the processor to group the plurality of events reports based also on the event descriptor.

7. The monitoring system of claim 6, wherein the event comprises at least one of a scheduled event and a user interaction with a user-interface component of the first screen, and wherein:
   if the event comprises the user interaction with the user-interface component, the event descriptor identifies the user-interface component.

8. The monitoring system of claim 5, wherein:
the event information comprises at least one of performance data associated with the event, battery consumption data associated with the event, financial data associated with the event, user satisfaction data associated with the event, and user input data associated with the event; and
the event summary comprises a statistical summary of the event information.

9. The monitoring system of claim 5, wherein to obtain the plurality of event reports, the instructions are executable to cause the processor to receive the plurality of event reports from a plurality of client devices.

10. The monitoring system of claim 5, further comprising a client device running the application, the client device comprising:
a processor to:
detect a new event associated with the application,
generate, in response to detecting the new event, a new event report, and
send the new event report to the monitoring device.

11. A non-transitory machine-readable storage medium storing instructions executable by at least one processor of a computing device to cause the computing device to:
detect different occurrences of a same event on a first screen of an application;
detect different second screens being displayed as results of the different occurrences of the event, wherein the different second screens include a successful second screen indicating success of the event and an unsuccessful second screen indicating a failure of the event;
obtain a first response time indicating a length of time for the application to process the event to display the successful second screen and a second response time indicating a length of time for the application to process the event to display the unsuccessful second screen;
obtain a plurality of event reports for the different occurrences of the event, wherein each of the plurality of event reports includes an identifier of the first screen where the event occurred, an identifier of the successful second screen or the unsuccessful second screen, and event information including the first response time or the second response time;
group the plurality of event reports into a plurality of groups including a first group of event reports associated with the successful second screen and a second group of event reports associated with the unsuccessful second screen; and
generate a performance summary that summarizes the first group of event reports associated with the successful second screen and the first response time, and the second group of event reports associated with the unsuccessful second screen and the second response time.

12. The non-transitory machine-readable storage medium of claim 11, wherein the application is running on a client device.

13. The non-transitory machine-readable storage medium of claim 11, wherein the event is a request for a resource via a hypertext transfer protocol (HTTP) and a response to the request in one of the different second screens comprises an HTTP status code indicating that the request was processed either successfully or unsuccessfully.

* * * * *